Patented Mar. 26, 1940

2,194,491

UNITED STATES PATENT OFFICE 2,194,491

PREVENTION OF CORROSION

Paul G. Bird, Western Springs, and Roland M. Waters, Chicago, Ill.

No Drawing. Application March 30, 1939, Serial No. 264,982

9 Claims. (Cl. 252—5)

This invention relates to corrosion prevention and has for an object the provision of a means whereby the corrosive action of solutions on metals can be markedly reduced or substantially entirely prevented.

The corrosive action of solutions on metals presents an important problem in various industries. One instance in which the problem has become particularly important is in the selection of fluids which may be used in the cooling systems of internal combustion motors. Solutions that have been employed in the past have a tendency to exert a marked corrosive action on the metals with which they come in contact in the cooling system. This has been particularly true where water or aqueous solutions have been employed. Pure water or aqueous solutions under conditions such as are present within the cooling systems of internal combustion engines, the automobile in particular, readily attack the iron and other metals with which they come into contact within the cooling system. Considerable amounts of rust and other sludge material form which has a tendency to clog up the radiator and other passageways within the cooling system.

Many types of substances have been employed in the past in an attempt to decrease the corrosive activity of aqueous solutions within cooling systems. Various types of electrolytes such as dichromates have been employed with more or less success. It has also been proposed to employ various oils in an emulsified form to regulate the amount of corrosion within the system. These solutions or preparations, however, have not been entirely effective. Those containing insoluble oils in an emulsified state have a tendency to form an oil deposit on the metallic surfaces within the cooling system, which adversely affects the transfer of heat and the circulation within the system. The inorganic electrolytes that have been employed have not been successful in entirely preventing corrosion, although they have inhibited it to some extent.

The present invention contemplates a solution which is substantially completely noncorrosive for those metals which are commonly employed in the construction of various types of cooling systems. It is cheap and readily prepared. It may be employed in water solution or in various types of antifreeze mixtures such as water and alcohol, water and glycerine, water and ethylene glycol, and the like. According to the invention, the addition of mercaptobenzothiazole or its salts, and soluble phosphites or hypophosphites, to the solution of which it is desired to decrease the corrosive action is employed.

In order that the invention may be more clearly understood, the following example is given for the preparation of a solution which has marked anticorrosive properties. The sodium salts of mercaptobenzothiazole and disodium phosphite are added to water directly in order to give, say, a concentration of 0.13% of the sodium salt of the mercaptobenzothiazole and 0.26% of the phosphite (as $Na_2HPO_3 \cdot 5H_2O$). The aqueous solution thus produced was found to be substantially entirely noncorrosive for cast iron, aluminum, copper, and solder. These metals are those with which fluids in cooling systems most generally come into contact, and the solution thus provided is, therefore, very desirable because of its noncorrosive properties. It has been found that a solution prepared in accordance with the above-indicated formula is substantially noncorrosive when made up with soft waters or hard waters containing considerable amounts of dissolved solids. The above indicated anticorrosive ingredients are therefore effective for use in any type of water to produce a useful anticorrosive solution.

In order to test the corrosive action of a solution prepared in accordance with the above formula, the solution was placed in small jars, and pieces of cast iron, copper, aluminum, and solder were immersed therein. The solution was then heated to 180° F. and air was continually passed through it in order to simulate conditions such as are to be found in an ordinary gasoline engine cooling system. The heat and aeration treatment was continued at eight-hour intervals in each twenty-four hours for a period of several weeks. In all cases where the above formula was employed for making up the solution, the samples of metals in the jar showed no signs of corrosion whatsoever. The solution remained clear, the iron was free of any traces of rust, and the copper was still bright. A parallel test on a water sample containing no inhibitor showed marked corrosion of the iron and aluminum. The test was also made on an aqueous solution which originally contained 300 parts per million of sodium chloride, which, without the addition of an inhibitor, is a very corrosive solution. The inhibiting material of the present invention, however, entirely prevented any corrosive action of the sodium chloride and water on the solution.

In order to compare the effectiveness of the inhibitor of the present invention with certain of those that have been employed in the past, an inhibited solution was prepared by the method indicated above and another was prepared in accordance with prior art methods by dissolving sodium dichromate ($Na_2Cr_2O_7 \cdot 2H_2O$) in water to give a final concentration of 0.32% of dichromate. The water to be tested in each case originally contained 300 parts per million of sodium chloride. Each solution was subjected to the aeration treatment hereinabove described. Within a few days the dichromate solutions were corroding the iron and aluminum contained therein. The metals in the solution prepared in accordance with the present invention, however, had not corroded after a period of several weeks.

A comparative test was also employed with a commercial soluble oil rust inhibitor which was prepared in accordance with methods that are well known in the prior art. After the test was started, a milky white emulsion was soon formed in the solution, which finally started to deposit a gummy greasy substance on the metal, which indicated its undesirability for use as a heat transfer agent in radiator cooling systems. In all cases, when the activity of the water was inhibited by the means contemplated in the present invention, the metals remained shiny and noncorroded at all times.

It has been proposed in the past to employ alkali metal nitrites with mercaptobenzothiazole in order to inhibit corrosion. This means may be quite effective for preventing the corrosion only if a relatively soft water is employed. The presence of any considerable amounts of hardness or the presence of even 30 parts per million of sodium chloride will render the inhibitor prepared from the nitrite substantially noneffective. The inhibited solution prepared from the phosphites, however, in accordance with the present invention, is effective even in solutions containing 300 parts per million of sodium chloride.

It will be recognized, of course, that various percentages of the sodium salt of mercaptobenzothiazole and sodium phosphite may be employed if desired. The amounts may depend largely on the type of water which is treated. A comparatively soft water containing only 8 grains per gallon of dissolved solids may require only 0.05% of the salt of mercaptobenzothiazole and 0.19% of disodium phosphite pentahydrate, for waters containing around 28 grains per gallon of dissolved solids may be inhibited by the quantities of ingredients that have been previously indicated (i. e., 0.13% of the thiazole salt and 0.26% of the phosphite). These latter amounts will usually be found to be satisfactory for general usage. It will, of course, be recognized that the proportions may be changed, if desired, in order to get the desired results and, also, the relative proportions of the thiazole salt and the phosphite may be varied.

This invention is not to be restricted to the use of sodium phosphite, but includes the use of all soluble salts of the phosphites and hypophosphites. Also, any of the soluble salts of the mercaptobenzothiazole may be employed in place of the sodium salt. If desired, the mercaptobenzothiazole may be introduced into the solution without converting it into the soluble salt form. The thiazole itself is relatively insoluble in water. However, it may be introduced into the solution by first dissolving it in a small quantity of alcohol or similar organic solvent and subsequently adding the solution to the water. This may be desirable particularly where alcohol is added to the water, in order to prepare a solution having a depressed freezing point. Thus, the inhibitor prepared in accordance with this invention may be employed for use with water alone or for solutions having a depressed freezing point, containing methyl alcohol, ethyl alcohol, ethylene glycol, glycerin, and the like, using one or more of these freezing-point depressants, or a portion thereof, as solvents for the mercaptobenzothiazole.

While the means for inhibiting the corrosive properties of solutions has been described above with reference to those solutions employed in the water cooling systems of internal combustion motors, it will be obvious that it may also have many other uses. For example, it may also be used in any closed system for circulating either hot or cold water. It is contemplated that the present invention may be employed in a large variety of cases wherein it is desired to control or eliminate the corrosive action of fluids on metals.

As a further alternative, a solid composition may be provided, consisting of a mixture of appropriate amounts of mercaptobenzothiazole, an alkali phosphite or hypophosphite and a sufficient quantity of an alkali to combine with the thiazole when the mixture is dissolved in water, and the invention is to be construed as contemplating such a procedure as well.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

We claim:

1. A corrosion inhibiting solution containing mercaptobenzothiazole and a salt selected from the group consisting of the soluble phosphites and the soluble hypophosphites.

2. A noncorrosive solution for use in cooling systems and the like which comprises an aqueous solution of a water-soluble salt of mercaptobenzothiazole and a water-soluble phosphite.

3. A solution characterized by its nonreactivity to metals containing corrosion inhibiting quantities of a compound selected from the group of mercaptobenzothiazole and its salts and a compound selected from the group consisting of soluble phosphites and soluble hypophosphites.

4. A solution having noncorrosive characteristics comprising water and corrosion inhibiting quantities of the sodium salt of mercaptobenzothiazole and a sodium phosphite.

5. A noncorrosive antifreeze solution comprising water, alcohol, the sodium salt of mercaptobenzothiazole and sodium phosphite.

6. A noncorrosive aqueous solution comprising water and approximately 0.13% by weight of the sodium salt of mercaptobenzothiazole and approximately 0.26% by weight of

$Na_2HPO_3 \cdot 5H_2O$

7. A corrosion inhibiting composition adapted to be added to a fluid which contacts metallic surfaces, said composition comprising a compound selected from the group consisting of mercaptobenzothiazole and its salts, and a compound selected from the group consisting of phosphites and hypophosphites which are soluble in said fluid.

8. A composition to be added to aqueous solutions to inhibit their corrosive properties which comprises mercaptobenzothiazole and a water-soluble alkali phosphorus compound from the group consisting of the phosphites and hypophosphites.

9. A composition to be added to aqueous solutions to inhibit their corrosive properties which comprises mercaptobenzothiazole, a water-soluble alkali phosphorus compound from the group consisting of the phosphites and hypophosphites, and sufficient alkali to combine with the mercaptobenzothiazole to form a salt thereof when the mixture is dissolved in water.

PAUL G. BIRD.
ROLAND M. WATERS.